United States Patent
Patel et al.

(10) Patent No.: US 9,461,559 B2
(45) Date of Patent: Oct. 4, 2016

(54) ACTIVE FRONT END POWER CONVERTER WITH BOOST MODE DERATING TO PROTECT FILTER INDUCTOR

(71) Applicants: Yogesh Patel, Grafton, WI (US); Lixiang Wei, Mequon, WI (US)

(72) Inventors: Yogesh Patel, Grafton, WI (US); Lixiang Wei, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 615 days.

(21) Appl. No.: 13/832,214

(22) Filed: Mar. 15, 2013

(65) Prior Publication Data

US 2014/0268953 A1 Sep. 18, 2014

(51) Int. Cl.
*H02M 1/00* (2006.01)
*H02M 1/32* (2007.01)
*H02M 1/42* (2007.01)
*H02M 7/217* (2006.01)
*H02M 7/219* (2006.01)

(52) U.S. Cl.
CPC .............. *H02M 7/217* (2013.01); *H02M 1/32* (2013.01); *H02M 1/4216* (2013.01); *H02M 1/4225* (2013.01); *H02M 7/219* (2013.01); *H02M 2001/0022* (2013.01); *H02M 2001/327* (2013.01); *Y02B 70/126* (2013.01)

(58) Field of Classification Search
CPC .... H02M 7/217; H02M 5/225; H02M 5/257; H02M 5/40; H02M 5/4504
USPC .......................................................... 363/89
See application file for complete search history.

(56) References Cited

U.S. PATENT DOCUMENTS

| | | | |
|---|---|---|---|
| 6,963,178 B1 * | 11/2005 | Lev et al. | 315/307 |
| 7,106,025 B1 | 9/2006 | Yin et al. | |
| 7,164,254 B2 | 1/2007 | Kerkman et al. | |
| 7,332,885 B2 * | 2/2008 | Schnetzka | H02J 9/062 318/400.01 |
| 7,495,410 B2 | 2/2009 | Zargari et al. | |
| 7,683,568 B2 | 3/2010 | Pande et al. | |
| 7,751,211 B2 * | 7/2010 | Yuzurihara | H02M 7/125 363/127 |
| 7,830,036 B2 | 11/2010 | Wei et al. | |
| 7,990,097 B2 | 8/2011 | Cheng et al. | |
| 8,188,693 B2 | 5/2012 | Wei et al. | |
| 2005/0068001 A1 | 3/2005 | Skaug et al. | |
| 2007/0063668 A1 | 3/2007 | Schnetzka et al. | |
| 2009/0122582 A1 * | 5/2009 | Ye | H02M 1/4233 363/89 |

(Continued)

FOREIGN PATENT DOCUMENTS

CN 101375490 A 2/2009
CN 202085130 U 12/2011

OTHER PUBLICATIONS

Stockman K et al, Embedded Solutions to Protect Textile Processes against Voltage Sags, Oct. 13, 2002, IEEE, Conference Record: Industry Application Conference, p. 2564, Figure 8.*

(Continued)

*Primary Examiner* — Jessica Han
*Assistant Examiner* — Bart Iliya
(74) *Attorney, Agent, or Firm* — Fay Sharpe LLP

(57) ABSTRACT

Methods and apparatus are presented for controlling a power converter to protect input filter inductors from overheating, in which an active front end (AFE) rectifier is operated in a boost mode to provide a boosted DC voltage at a derated output current value selected according to the DC bus voltage boost amount corresponding to a maximum load condition for which the filter inductors will not overheat.

21 Claims, 5 Drawing Sheets

(56) References Cited

U.S. PATENT DOCUMENTS

| | | |
|---|---|---|
| 2012/0075892 A1 | 3/2012 | Tallam et al. |
| 2012/0235607 A1 | 9/2012 | Wei et al. |

OTHER PUBLICATIONS

European Search Report, EP Appl. No. 14160229.2; completed Jun. 12, 2014; mailed Jun. 23, 2014; Examiner Sorin Gusia, The Hague; 9 pgs.

Van Zyl, "Voltage Sag Ride-Through for Adjustable-Speed Drives With Active Rectifiers", IEEE Transactions on Industry Applications, vol. 34, No. 6, Dec. 1, 1998, pp. 1270-1277.

Stockman et al., "Embedded Solutions to Protect Textile Processes Against Voltage Sags", 2002 IEEE Industry Applications Conf, 37th IAS Annual Meeting, Oct. 13, 2002, 6 pgs.

Chinese Office Action and Search Report, CN Appl. No. 201410098926.9; issued Jan. 29, 2016; (search dated Jan. 20, 2016); Examiner Sumei Zhou; 13 pgs.

\* cited by examiner

ACTIVE FRONT END POWER CONVERTER WITH BOOST MODE DERATING TO PROTECT FILTER INDUCTOR

BACKGROUND

Power conversion systems are used to provide AC output power to a load, such as motor drives with an inverter stage driving an AC motor. Active front end (AFE) converters employ a switching rectifier to convert input AC power to provide DC power to a bus, with the inverter switches converting the DC bus to output currents to drive the load. Such active front end converters are typically coupled with input filters, such as LCL filter circuits connected to each power phase. Since the front end rectifier is a switching circuit, the input filter operates to prevent introduction of unwanted harmonic content into the power grid or other input source. Filter components, including the filter inductors, are typically designed according to the power converter rating, where oversizing input filter components adds cost to the system and occupies valuable enclosure space. However, situations may occur in which grid voltages sag, or in which an available input source voltage is lower than the nominal AC input voltage for which the converter was designed. In certain applications, moreover, it may be desirable to operate a higher voltage motor or other load even though the source voltage is low, for instance, a 400 V input voltage to drive a 460 V motor. In these situations, the active front end rectifier can be operated in boost mode to essentially increase the gain of the front end converter, thereby boosting the DC bus voltage. At full load conditions, however, boost mode operation of the active front end rectifier leads to increased ripple and other harmonics, which can overheat the filter inductor core. One or more thermal shutoff switches may be positioned to sense the inductor temperature increase and cause a safe system shutdown. However, tripping the drive may not be desired in certain applications, and thus it is desirable to have a technique to allow the system to operate in boost mode without shutdown. In addition, such a thermal switch may be positioned some distance from the inductor core in order to sense temperature increases due to multiple causes, such as to detect whether a system blower fan is off while a full load is being driven, and thus may be unable to quickly detect overheating in the filter inductor core. Adding multiple thermal switches may address this issue, but this approach adds further cost and complexity to the system. Accordingly, there is a need for improved power converter apparatus and operating techniques to facilitate selective operation with an active front end in boost mode while mitigating or avoiding thermal stress to filter inductors.

SUMMARY

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides motor drives and other power conversion systems as well as control techniques therefor, in which the power converter is selectively derated in boost mode to protect input filter inductors from thermal stress.

A power converter operating method is provided, in which a rectifier is operated in a boost mode to provide a DC bus voltage above the peak line to line AC input voltage, and a derated output current value is determined according to the input voltage and according to the amount of DC bus voltage boost, where the derated output current is less than or equal to the maximum output current rating of the power converter. In certain implementations, an active front end power converter drives a DC load at a derated rectifier output current level, where the DC load of the rectifier can be an output inverter that provides a DC current command to the rectifier according to the derated output current value. In other applications, the active front end converter operates in boost mode and provides a DC output current to other forms of DC load such as a battery charging system, solar array, fuel cell, etc. according to the derated output current value. By this approach, thermal stress to the filter inductor components can be mitigated or avoided on the front end converter is operated in boost mode, without the need to oversize the filter inductors. In certain embodiments, the derated output current value is obtained from a lookup table corresponding to the line to line AC input voltage, and the method may involve selectively interpolating values of the lookup table to derive the derated output current value. Multiple lookup tables may be used, individually, with a given lookup table being selected according to an associated input voltage level. In certain implementations, the DC bus voltage boost amounts and corresponding derated output current values of the lookup table or tables correspond to maximum steady state load operating conditions of the power converter for which an input filter inductor is designed not to overheat. In certain embodiments, a derating formula is solved according to the DC bus voltage boost amount in order to determine the derated output current value. Non-transitory computer readable mediums are provided with computer executable instructions for implementing the power conversion system operating methods.

Power conversion systems are provided, including an active rectifier that provides a DC bus voltage, and a controller operates the rectifier in a boost mode to provide the DC bus voltage above the peak line to line AC input voltage. The controller determines a derated output current value according to the line to line AC input voltage and according to a DC bus voltage boost amount, and selectively operates the rectifier according to the derated output current value. In certain embodiments, the derated output current value and the corresponding DC bus voltage boost amount correspond to a maximum steady state load operating condition of the power converter for which one or more filter inductors are designed not to overheat. The controller in certain embodiments obtains the derated output current value from a lookup table according to the DC bus voltage boost amount, and the controller may selectively interpolate current values of the lookup table to derive the derated output current value. In addition, the controller may select a given one of a plurality of lookup tables corresponding to the line to line AC input voltage, and may use interpolation of values of the selected lookup table to obtain the derated output current value. In various implementations, moreover, the controller may determine the derated output current value by solving at least one derating formula according to the DC bus voltage boost amount.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
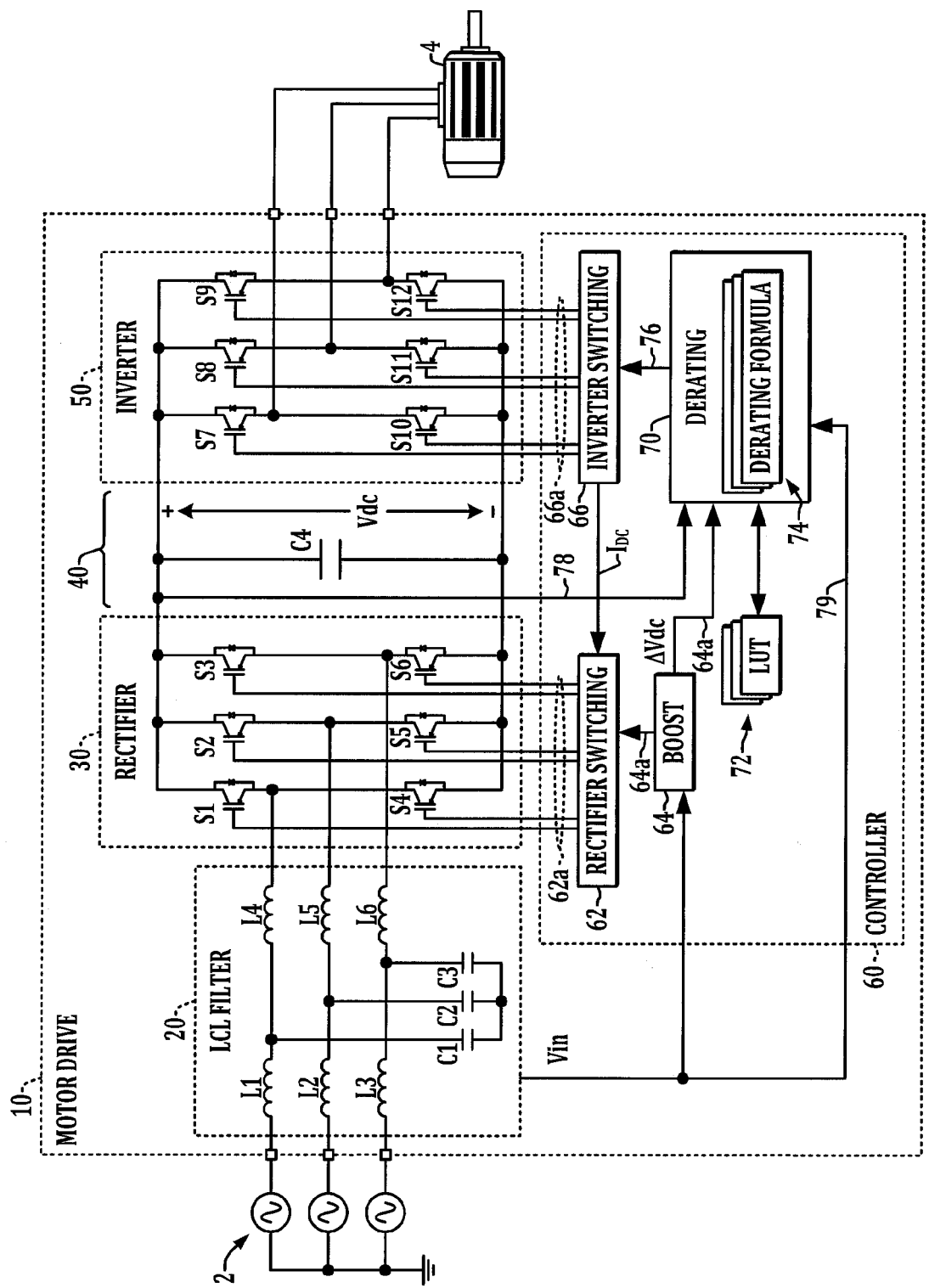
FIG. 1 is a schematic diagram illustrating an exemplary motor drive power converter with boost mode derating control to protect input filter inductors in accordance with one or more aspects of the present disclosure.

Referring now to the figures, several embodiments or implementations are hereinafter described in conjunction with the drawings, wherein like reference numerals are used to refer to like elements throughout, and wherein the various features are not necessarily drawn to scale. Methods and apparatus are disclosed for operating a motor drive or other active front end power conversion systems with an active front end operative in a boost mode to generate a DC bus with a voltage higher than a peak line to line AC input voltage level. Although illustrated and described below in the context of AC motor drives, the various concepts of the present disclosure find utility in association with other forms of power conversion systems having an active front end converter driving a DC load, wherein the present disclosure is not limited to the illustrated examples.

FIG. 1 illustrates an exemplary motor drive power conversion system 10 receiving single or multiphase AC input power from an external power source 2. The illustrated example receives a three phase input, but single phase or other multiphase embodiments are possible. The motor drive 10 includes an input filter circuit 20, in this case a three phase LCL filter having grid side inductors L1, L2 and L3 connected to the power leads of the power source 2 as well as series connected converter side inductors L4, L5 and L6, with filter capacitors C1, C2 and C3 connected between the corresponding grid and converter side inductors and a common connection node, which may but need not be connected to a system ground. Although illustrated in the context of a three phase LCL filter circuit 20, other alternate circuit configurations can be used, including without limitation LC filters.

Figure 7:
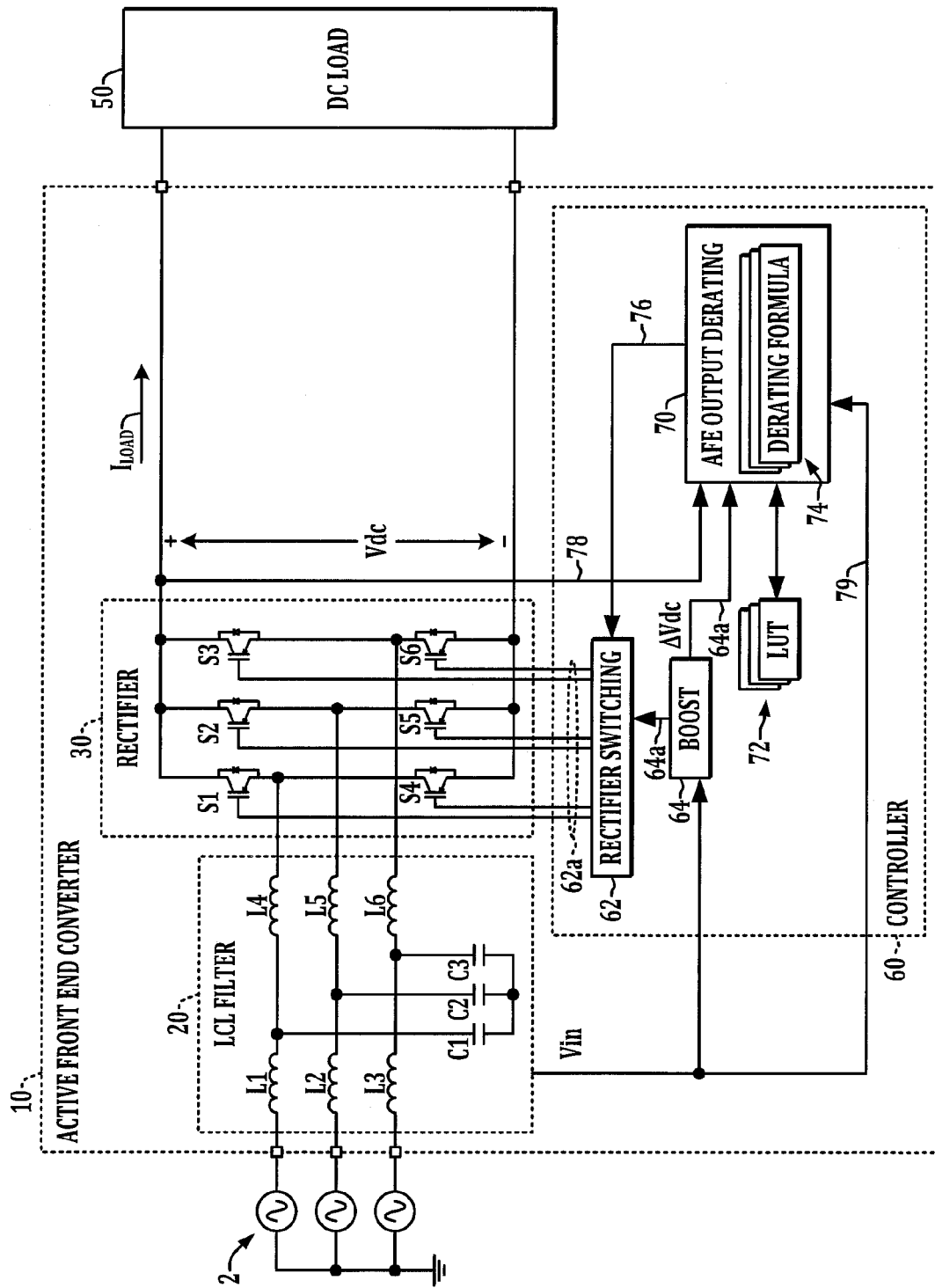
FIG. 7 is a schematic diagram illustrating another embodiment of an active front end power converter driving a DC load with a boosted voltage at a derated output current level according to the present disclosure.

The motor drive 10 includes an input filter circuit 20, a rectifier 30, a DC bus or DC link circuit 40 and an output inverter 50, with the rectifier 30 and the inverter 50 being operated by a controller 60. The controller 60 includes a rectifier controller 62 with an associated boost logic circuit 64, an inverter controller 66 and a derating control component 70 operative using one or more lookup tables (LUTs) 72 and/or one or more derating formulas 74 to selectively derating the rectifier output current when the rectifier 30 is operated in boost mode as described further hereinafter. In the illustrated example, the derating control component 70 provides a derated output current value 76 to the inverter switching controller 66, which in turn provides a DC current command value IDC to the rectifier switching controller 62 in order to operate the rectifier 30 at a derated output current level. In other possible implementations, the derating components 70 provides a derated output current value 76 directly to the rectifier switching controller 62 (FIG. 7 below).

The controller 60 and the components thereof may be implemented as any suitable hardware, processor-executed software, processor-executed firmware, logic, and/or combinations thereof wherein the illustrated controller 60 can be implemented largely in processor-executed software or firmware providing various control functions by which the controller 60 receives feedback and/or input signals and/or values (e.g., setpoint(s)) and provides rectifier and inverter switching control signals 62a and 66a to operate switching devices S1-S6 of the rectifier 30 and switches S7-S12 of the inverter 50 to convert input power for providing AC output power to drive the load 4. In addition, the controller 60 and the components 62, 64, 66, 70 and/or 72 thereof can be implemented in a single processor-based device, such as a microprocessor, microcontroller, FPGA, etc., or one or more of these can be separately implemented in unitary or distributed fashion by two or more processor devices.

The motor drive 10 provides an active front end (AFE) including a switching rectifier (also referred to as a converter) 30 receiving three-phase power from the source 2 through the filter circuit 20. The rectifier 30 includes rectifier switches S1-S6, which may be insulated gate bipolar transistors (IGBTs) or other suitable form of semiconductor-based switching devices operable according to a corresponding rectifier switching control signal 62a to selectively conduct current when actuated. In addition, as seen in FIG. 1, diodes are connected across the individual IGBTs S1-S6. In operation, switching of the rectifier switches S1-S6 is controlled according to pulse width modulated rectifier switching control signals 62a to provide active rectification of the AC input power from the source 2 to provide a DC bus voltage Vdc across a DC bus capacitance C4 in a DC link circuit 40. The rectifier 30, moreover, can be selectively operated by the rectifier switching control component 62 of the motor drive controller 60 for normal operation or boost mode operation according to boost control logic 64. In boost operation, the rectifier switching control component 62 provides the signals 62a to cause the rectifier 30 to generate the DC bus voltage at a level above the peak line to line AC input voltage received from the input source 2.

The drive 10 in FIG. 1 further includes an inverter 50 with switches S7-S12 coupled to receive power from the DC bus 40 and to provide AC output power to a motor or other load 4. The inverter switches S7-S12 are operated according to switching control signals 66a from an inverter switching control component 66 of the drive controller 60, and can be any form of suitable high-speed switching devices, including without limitation IGBTs. The inverter controller 66 also provides a DC current command signal or value IDC to the rectifier switching controller 62 to cause the rectifier controller 62 to operate the rectifier switches S1-S6 to provide a DC output current to the DC link circuit 40 accordingly. In addition, the controller 60 receives various input signals or values, including setpoint signals or values for desired output operation, such as motor speed, position, torque, etc., as well as feedback signals or values representing operational values of various portions of the motor drive 10. Among these are a DC bus voltage feedback signal or value 78 representing the DC bus voltage Vdc, and a signal or value 79 representing the line to line AC input voltage value.

Figure 5:
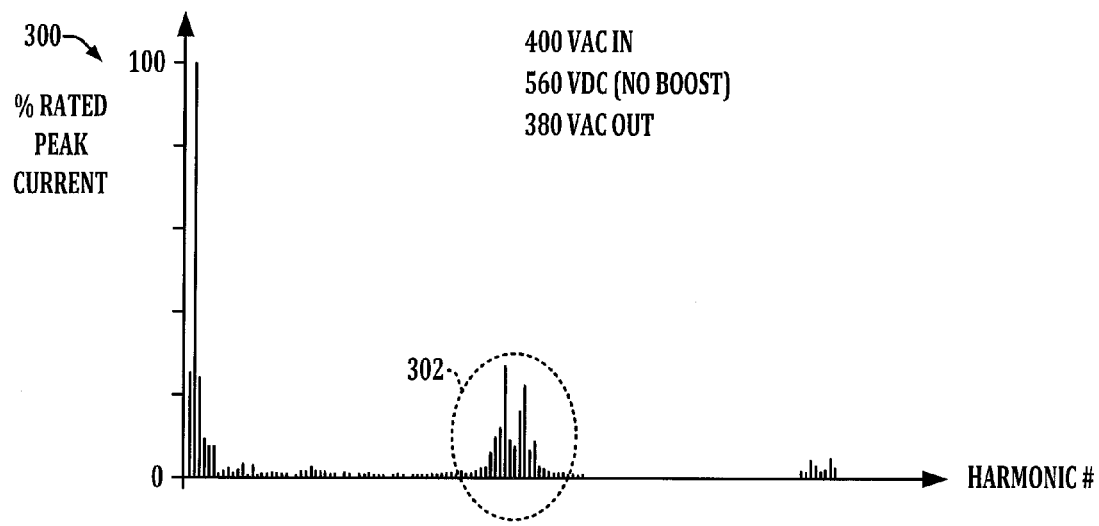
FIG. 5 is a graph illustrating filter inductor current harmonic content for a power converter with an active front end in normal operation with no boost.
Figure 6:
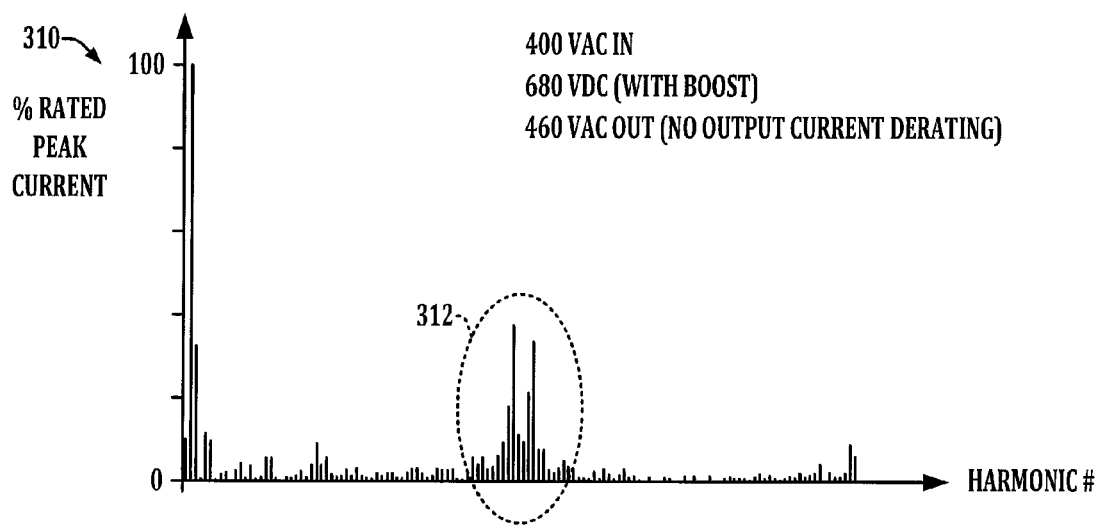
FIG. 6 is a graph illustrating filter inductor current harmonic content for a power converter with boost mode operation of the active front end rectifier with no output current derating.

Referring also to FIGS. 5 and 6, operation of the active front end rectifier 30 in boost mode may arise under a variety of circumstances. For instance, a motor drive 10 may be designed for an output current (or horsepower) rating based on receipt of AC input power at a certain nominal voltage level or range, such as 480 V AC in one example. In certain embodiments, the controller 60 employs the boost control component 64 to selectively switch the rectifier switching control component 64 from normal to boost operation, and provides an additional DC bus voltage boost amount required to operate the inverter motor (e.g., a DC bus voltage boost amount) 64*a* (ΔVdc) to the derating system 70 as well as to the rectifier switching controller 62. In certain implementations, moreover, the boost amount 64*a* may be preprogrammed into the controller 60, or may be user configurable. For example, the motor drive 10 may be designed for a certain AC input voltage value or range (e.g., 480 V, 60 Hz), but may be installed for use in an environment providing only 380 V AC input. In such a situation, the controller 60 may be programmed with a fixed DC voltage boost value 64*a* for use by the rectifier switching controller 62 and the derating system 70.

As seen in FIG. 5, normal operation of the rectifier 30 (without boosting) with a nominal AC input voltage results in certain harmonic content in the filter circuit 20. FIG. 5 shows a graph 300 illustrating the harmonic content as a percentage of rated peak current for an exemplary motor drive operated with a 400 V AC input providing a 560 V DC bus without use of boost operation, and with an output from the inverter 50 providing a 380 V AC output to a load. Under this condition, the regular DC bus voltage to operate a 400 V motor will be 560 V DC. In this non-boosting rectifier operational condition, a certain level of harmonics are seen at 302, approximately near 4 kHz for a 60 Hz AC input frequency. However, if the system is to drive a 460 V motor, the DC bus voltage needs to be increased to 680 V DC. As a result, the additional DC voltage boost amount is 680–560=120 V DC. A graph 310 in FIG. 6 shows percent rated peak current frequency content for the same converter 10 operated again from a 400 VAC input source, with active front end rectifier boost operation being used to boost the DC voltage Vdc above the line to line input voltage peak, in this case to 680 V DC. In this case, moreover, the output inverter 50 provides a 460 VAC output with no derating of the rectifier output current. As seen in FIG. 6, the corresponding peak current harmonic content 312 is significantly higher than the corresponding harmonic content 302 in the non-boosting example of FIG. 5.

The inventors have appreciated that increased harmonic content in boost mode leads to increased operating temperature of the inductor cores of the filter circuit inductors L4-L6. In particular, the converter side inductors L4-L6 may suffer thermal stress caused by boost operation of the active front end rectifier 30. In this regard, motor drives and other active front end power conversion systems 10 are typically designed around a nominal rating condition, including rated AC input voltage levels and corresponding DC bus voltages and currents, as well as drive output power or current levels. In order to economize a design with respect to cost, heat and cabinet space, the input filter inductors L are typically designed around the nominal rating condition, and thus switching operation to boost mode may cause excessive thermal stress to the inductors as the increased harmonics heat up the core structure. As noted above, thermal shutoff switches can be used to attempt to detect overheating of inductor cores, but extensive sensor coverage is both expensive and adds to the complexity of the motor drive system 10. Moreover, many situations arise in practice in which it is desirable to operate a power converter 10 with the rectifier boosting the DC bus voltage beyond the peak line AC input voltage value. Simply providing thermal shutdown capability may protect the filter inductors L from thermal stress, but may generate undesirable system shutdowns. Another approach to address this issue is to design the filter inductors L to accommodate the higher harmonic content associated with boost mode operation, but this requires increasing the size and cost of the input filter circuit 20 and the components thereof.

The present disclosure addresses these shortcomings of the prior art by selectively derating the motor drive output, in particular the maximum output current from the rectifier 30, based on boost mode operation. Using this novel technique, the filter inductors L need not be oversized, and the system can operate intermittently or even continuously in rectifier boost mode without triggering undesirable shutdowns, while protecting the filter inductors L from thermal stress. In particular, the controller 60 employs the derating system 70 which provides the inverter switching controller 66 with a derated output current value 76 during active front end boost mode operation. The inverter controller 66 in this embodiment provides a lowered or derated DC current command value $I_{DC}$ to the rectifier controller 62 in order to operate the rectifier 30 according to the derated output current value 76 during active front end boost mode. The derating amount 76 is determined according to the AC input voltage present at the source 2 (or the AC input voltage level at other measure points in the LCL filter circuit 20) based on one or more feedback signals or values 79, and also according to the DC bus voltage (feedback signal or value 78) and an amount of additional DC bus voltage boost 64*a* (ΔVdc) obtained from the boost control component 64. In certain embodiments, the derated output current value 76 can be represented as a percentage of the nominal output current rating for either the inverter 50 or the rectifier 30. In practice, moreover, the derated output current value 76 is less than or equal to the maximum output current rating for the power conversion system 10. In the embodiment of FIG. 7 below, the derated output current value 76 is provided directly to the rectifier switching controller 62, and may be representative of a percentage of the nominal DC output current rating for the rectifier 30.

Figure 2:
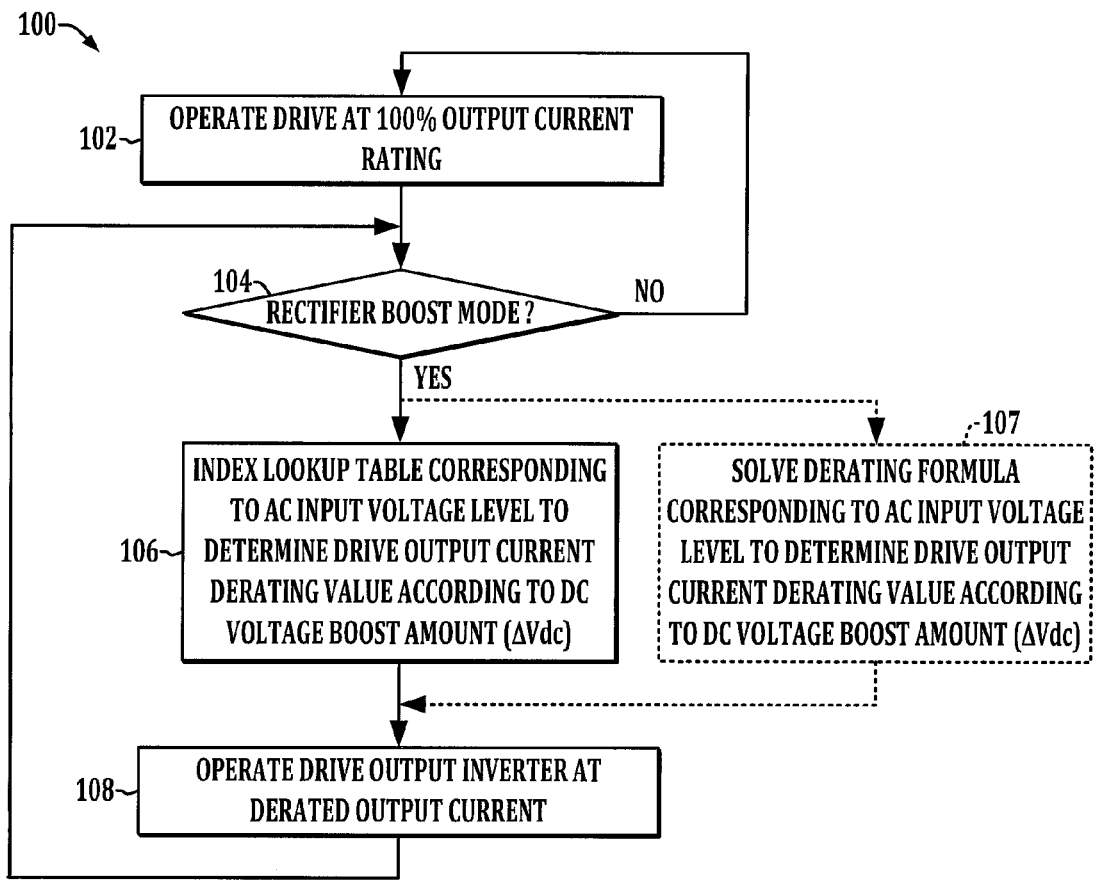
FIG. 2 is a flow diagram illustrating an exemplary power converter operating method for selectively derating a power converter output current during active front end rectifier boost mode operation.

Referring also to FIG. 2, a method 100 is illustrated for operating a power conversion system, which may be employed in the motor drive 10 of FIG. 1 or the active front end converter 10 of FIG. 7 below, or in any other power conversion system. While the method 100 is illustrated and described below in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 100 other methods of the disclosure may be implemented in hardware, processor-executed software, or combinations thereof, such as in the exemplary controller 60 described herein, and may be embodied in the form of computer executable instructions stored in a tangible, non-transitory computer readable medium, such as in a memory operatively associated with the controller 60 in one example.

The drive 10 or the rectifier 30 thereof may be operated with a normal 100% output current rating as shown at 102 in FIG. 2. A determination is made at 104 as to whether the rectifier 30 is operating in boost mode. If not (NO at 104), the drive 10 continues to be operated at the normal output current rating at 102. If the rectifier is in boost mode (YES at 104), the controller 60 determines a derated output current value (76 in FIG. 1 above) according to the line to line AC input voltage value (e.g., from feedback signal or value 79) and according to the DC bus voltage boost amount 64a from the boost control component 64, denoted in the figure as ΔVdc. In certain embodiments, the voltage boost amount is expressed in terms of volts DC, although not a strict requirement. For instance, if the nominal DC voltage (e.g., approximately the peak line to line AC input voltage value) is 560 V DC, boost mode operation to provide a DC bus voltage of 680 V DC would represent a 120 V DC bus voltage boost amount (ΔVdc=120 V DC). Other suitable representation schemes can be employed by which a DC bus voltage boost amount is used which in some way represents the effect of boost mode operation on the DC bus voltage Vdc.

The determination of the derated output current value 76 can be performed in a variety of ways. In one possible embodiment, the method 100 of FIG. 2 provides for use of a lookup table (e.g., lookup table 72 in FIG. 1), with the derated output current value 76 being obtained from a lookup table 72 corresponding to the line to line AC input voltage value. This can be accomplished, for instance, as seen at 106 in FIG. 2, by indexing the lookup table 72 which corresponds to the AC input voltage level in order to determine the drive output current derating value 76 associated with the DC voltage boost amount 64a EVdc. In another possible embodiment (shown in dashed line in FIG. 2) a derating formula may be solved at 107 corresponding to the AC input voltage level to determine the drive or rectifier output current derating value 76 according to the DC voltage boost amount ΔVdc 64a. The drive output inverter 50 is then operated at 108 according to the derated output current value 76, and provides the DC current command value to the rectifier switching controller 62 to operate the rectifier 30 according to the derating value 76. For example, the motor drive 10 and the inverter 50 thereof may receive one or more setpoint values representing a desired load drive condition, such as a setpoint torque, speed, position, etc. The inverter controller 66 in certain embodiments uses the output current derating value 76 as a maximum limit on the output current provided to the motor load 4. Thus, the inverter 50 will provide outputs, including the desired DC current command value $I_{DC}$ such that the derating value 76 is not exceeded, thereby ensuring that the filter inductors L are not thermally stressed. The process 100 then returns to again determine at 104 whether the rectifier continues to be operated in the boost mode as described above, and the process continues in this fashion as described above.

Figure 3:
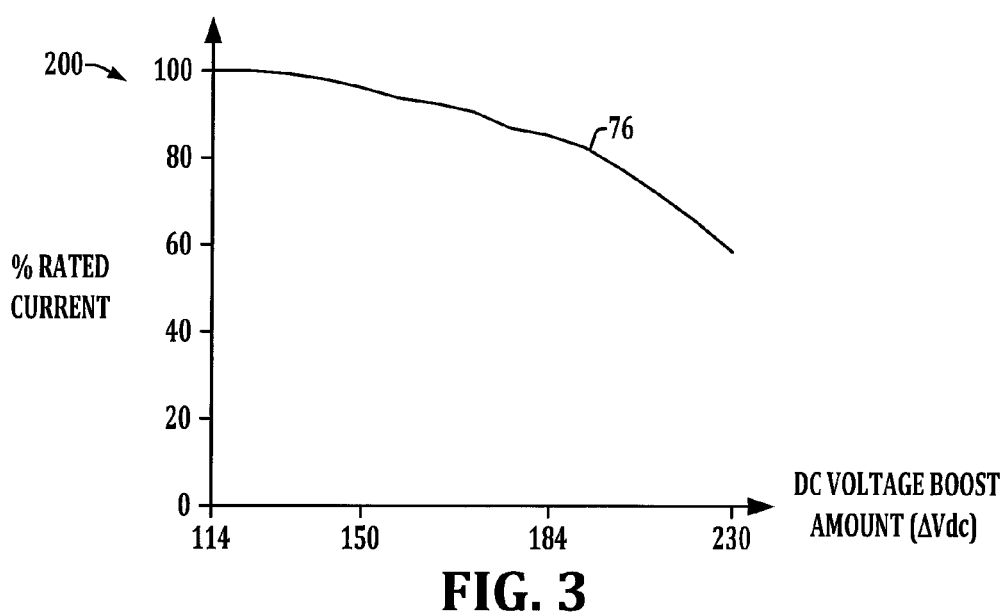
FIG. 3 is a graph illustrating an exemplary output current derating curve as a function of DC voltage boost.
Figure 4:
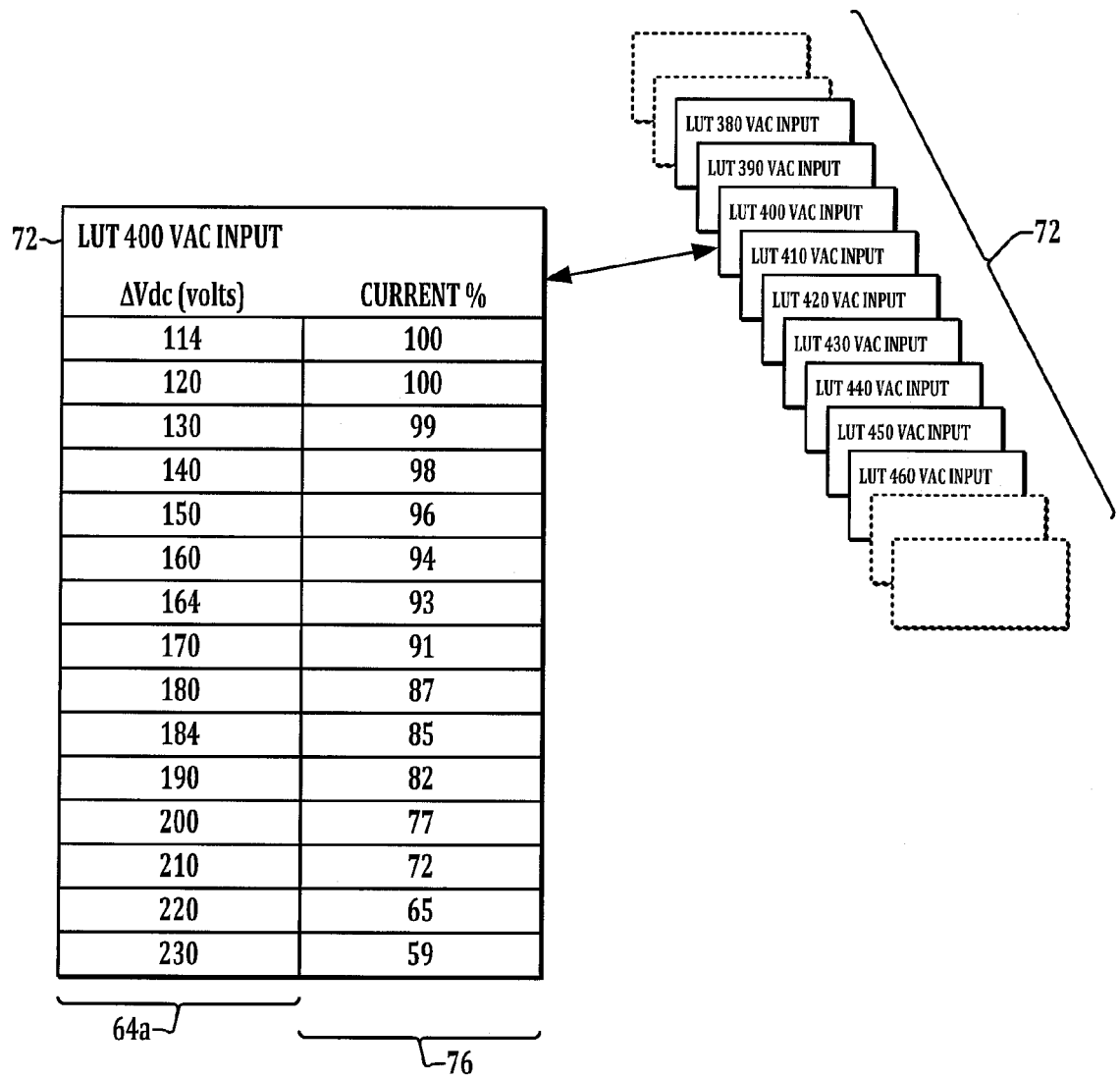
FIG. 4 illustrates an exemplary lookup table for selectively derating a power converter output current according to DC voltage boost.

Referring also to FIGS. 3 and 4, FIG. 3 shows a graph 200 depicting a curve 76 of percent rated current versus DC voltage boost amount for a 400 V AC line to line input voltage level, and FIG. 4 illustrates an exemplary lookup table 72 corresponding to the curve 202 in FIG. 3. The table in FIG. 4 in this example is chosen from a plurality of such tables 72, with each table 72 being associated with a particular AC input voltage value. As seen in FIG. 3, when the DC bus voltage is 114 V above normal, the drive or rectifier current rating is 100% (e.g., the derated output current value 76 is equal to the maximum output current rating for the power converter 10 as a whole or the rectifier 30 thereof). In this case, the curve 76 represents maximum steady state load conditions for which the filter inductors L will not be thermally stressed, and thus boosting the DC bus voltage by 114 V will allow the filter inductors L to avoid overheating. However, as the DC bus voltage boost amount 64a increases to 160 V and 184 V, the derated output current value 76 drops to approximately 93% and 85%, respectively. At these levels, therefor, controlling the inverter 50, and hence the rectifier 30, to provide no more than this derated amount of output current allows the filter inductors L to continue operation within the proper thermal range. In certain embodiments, a formula 74 (FIG. 1) can be used to evaluate the derating curve 76 for any given DC bus voltage boost amount, for example, a polynomial function.

Moreover, the curve 76 in FIG. 3 and a corresponding lookup table 72 in FIG. 4 correspond to a particular line to line AC input voltage value, where one or more such parametric functions 74 and/or lookup tables 72 may be provided. Thus, for instance, the derating system 70 in FIG. 1 may be configured to select an appropriate (e.g., closest) function 74 or lookup table 72 based on the line to line AC input voltage present in the system 10 (e.g., according to the input voltage feedback signal or value 79), and to use that function or lookup table to determine the derated output current value 76 according to the AC input line voltage value and according to the DC bus voltage boost amount 64a. Moreover, as seen in FIG. 4, certain embodiments may employ different lookup tables 72 for various AC input voltage levels, such as 380 V, 390 V, 400 V, etc. Likewise, the derating system 70 may employ one of a plurality of derating formulas 74, each corresponding to a different AC input voltage level, with the derating system 70 selecting a closest or most appropriate formula 74 according to the feedback 79. In one possible embodiment, the derating system 70 of the controller 60 is configured to dynamically receive the input voltage feedback signal or value 79 and choose the closest lookup table 72 for use in determining the derated output current value 76. Similarly, the derating system 70 may select from among a plurality of derating formulas 74 based on the AC input value 79.

When using a selected lookup table 72, moreover, the derating system 70 of the controller 60 may utilize interpolation for the derated output current value determination. As seen in FIG. 4, for instance, the controller 60 may interpolate between derated output current values 76 of the lookup table 72 corresponding to DC bus voltage boost amounts 64a above and below the DC bus voltage boost amount present in the power system 10 to derive the derated output current value 76 for use in operating the inverter 50, and hence the rectifier 30. For example, if the DC bus voltage boost amount 64a in the example of FIG. 4 was 175 V DC (ΔVdc=175), the controller 60 could use any suitable interpolation technique (e.g., linear or otherwise) with the corresponding derated output current values (e.g., 91% and 87%) corresponding to the DC bus voltage boost amounts (e.g., 170 V DC and 180 V DC) above and below the actual voltage boost in order to derive or compute the value 76 through interpolation (e.g., 89% in this example).

In certain implementations, the values of the lookup table 72 and the parameters of the derating formulas 74 can be selected such that they correspond to maximum steady state load operating conditions of the power converter 10 for which the input filter inductor (e.g., L) is designed not to overheat. This correlation can be obtained by any suitable means, such as by empirical testing to derive output current derating values 76 for a number of different DC bus voltage boost value 64a at which the temperature of the inductor core is at the rated value (or within an acceptable range thereof), and constructing a corresponding table 72 for each of a number of AC input voltage values. Likewise, experimental data can be used to derive formulas 74 (e.g., linear, polynomial, etc.) based on curve fitting or other suitable mathematical technique.

FIG. 7 illustrates another exemplary power conversion system, in this case an active front end converter 10 with a switching rectifier 30 and corresponding rectifier switching controller 62 as described above. In this example, however, the rectifier 30 provides a DC output to drive an external DC load 50. In this case, an active front end output derating component 70 provides the derated output current value 76 to the rectifier switching controller 62 directly. In operation, the rectifier controller 62 provides the switching control signals 62a in boost mode to provide boosted or increased DC output voltage to the load 50 above the peak line to line AC input voltage value, and also controls the DC output load current $I_{LOAD}$ provided to the load 50 so as not to exceed the derated output current value 76. As seen in FIG. 7, therefore, the concepts of the present disclosure advantageously facilitate AFE boost mode operation with derated rectifier output current limiting in a variety of applications for any number of types of DC load 50, such as capacitor bank charging, fuel cells, solar cells, etc., in addition to the above-described motor drive applications in which the rectifier 30 provides a boosted DC voltage across a DC bus circuit 40 for use by an inverter load.

In accordance with further aspects of the present disclosure, a non-transitory computer readable medium is provided, such as a computer memory, a memory within a power converter control system (e.g., controller 100), a CD-ROM, floppy disk, flash drive, database, server, computer, etc.), which includes computer executable instructions for performing the above-described methods. The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, processor-executed software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A method for operating a power conversion system, the method comprising:
    operating a rectifier of the power conversion system in a boost mode to provide a DC bus voltage higher than a peak line to line AC input voltage value;
    determining a derated output current value according to the line to line AC input voltage value and according to a DC bus voltage boost amount, the derated output current value being less than or equal to a maximum output current rating for the rectifier; and
    operating the rectifier according to the derated output current value.

2. The method of claim 1, wherein determining the derated output current value comprises:
    obtaining the derated output current value corresponding to the DC bus voltage boost amount from a lookup table corresponding to the line to line AC input voltage value.

3. The method of claim 2, wherein determining the derated output current value comprises:
    selectively interpolating two derated output current values of the lookup table corresponding to DC bus voltage boost amounts above and below the DC bus voltage boost amount present in the power conversion system to derive the derated output current value.

4. The method of claim 2, wherein determining the derated output current value comprises:
    selecting a given one of a plurality of lookup tables corresponding to the line to line AC input voltage value; and
    obtaining the derated output current value corresponding to the DC bus voltage boost amount from the given one of the plurality of lookup tables.

5. The method of claim 4, wherein determining the derated output current value comprises:
    selectively interpolating two derated output current values of the given one of the plurality of lookup tables corresponding to DC bus voltage boost amounts above and below the DC bus voltage boost amount present in the power conversion system to derive the derated output current value.

6. The method of claim 2, wherein the DC bus voltage boost amounts and corresponding derated output current values of the lookup table correspond to maximum steady state load operating conditions of the power conversion system for which an input filter inductor is designed not to overheat.

7. The method of claim 1, wherein determining the derated output current value comprises:
    solving at least one derating formula according to the DC bus voltage boost amount.

8. The method of claim 7, wherein determining the derated output current value comprises:
    selecting a given one of a plurality of derating formulas corresponding to the line to line AC input voltage value; and
    solving the given one of the plurality of the rating formulas according to the DC bus voltage boost amount.

9. The method of claim 1, comprising operating an inverter of the power conversion system according to the derated output current value.

10. A non-transitory computer readable medium with computer executable instructions for operating a power conversion system, the computer readable medium comprising computer executable instructions for:

operating a rectifier of the power conversion system in a boost mode to provide a DC bus voltage higher than a peak line to line AC input voltage value;

determining a derated output current value according to the line to line AC input voltage value and according to a DC bus voltage boost amount, the derated output current value being less than or equal to a maximum output current rating for the rectifier; and operating the rectifier according to the derated output current value.

11. The computer readable medium of claim 10, wherein the computer executable instructions for determining the derated output current value comprise computer executable instructions for:

obtaining the derated output current value corresponding to the DC bus voltage boost amount from a lookup table corresponding to the line to line AC input voltage value.

12. The computer readable medium of claim 11, wherein the computer executable instructions for determining the derated output current value comprise computer executable instructions for:

selectively interpolating two derated output current values of the lookup table corresponding to DC bus voltage boost amounts above and below the DC bus voltage boost amount present in the power conversion system to derive the derated output current value.

13. The computer readable medium of claim 11, comprising at least one lookup table including a plurality of derated output current values and corresponding DC bus voltage boost amounts.

14. The computer readable medium of claim 11, wherein the computer executable instructions for determining the derated output current value comprise computer executable instructions for:

solving at least one derating formula according to the DC bus voltage boost amount.

15. A power conversion system, comprising:

a filter circuit comprising at least one inductor;

an active rectifier comprising a plurality of rectifier switching devices coupled to receive AC input power from an external power source through the filter circuit and to provide a DC bus voltage at a DC bus; and a controller providing rectifier control signals to the rectifier switching devices to selectively operate the rectifier in a boost mode to provide the DC bus voltage higher than a peak line to line AC input voltage value, the controller being operative to determine a derated output current value according to the line to line AC input voltage value and according to a DC bus voltage boost amount, the derated output current value being less than or equal to a maximum output current rating for the active rectifier, the controller being operative to selectively operate the rectifier according to the derated output current value.

16. The power conversion system of claim 15, wherein the controller is operative to obtain the derated output current value corresponding to the DC bus voltage boost amount from a lookup table corresponding to the line to line AC input voltage value.

17. The power conversion system of claim 16, wherein the controller is operative to selectively interpolate two derated output current values of the lookup table corresponding to DC bus voltage boost amounts above and below the DC bus voltage boost amount present in the power conversion system to derive the derated output current value.

18. The power conversion system of claim 16, wherein the controller is operative to select a given one of a plurality of lookup tables corresponding to the line to line AC input voltage value, and to obtain the derated output current value corresponding to the DC bus voltage boost amount from the given one of the plurality of lookup tables.

19. The power conversion system of claim 18, wherein the controller is operative to selectively interpolate two derated output current values of the given one of the plurality of lookup tables corresponding to DC bus voltage boost amounts above and below the DC bus voltage boost amount present in the power conversion system to derive the derated output current value.

20. The power conversion system of claim 15, wherein the controller is operative to determine the derated output current value by solving at least one derating formula according to the DC bus voltage boost amount.

21. The power conversion system of claim 15, wherein the derated output current value and the corresponding DC bus voltage boost amount correspond to a maximum steady state load operating condition of the power conversion system for which the at least one inductor is designed not to overheat.

* * * * *